United States Patent

[11] 3,619,227

| | | |
|---|---|---|
| [72] | Inventor | Frederick Roy Tomkinson<br>Saddleworth, near Oldham, England |
| [21] | Appl. No. | 744,703 |
| [22] | Filed | July 15, 1968 |
| [45] | Patented | Nov. 9, 1971 |
| [73] | Assignee | Pfizer Inc.<br>New York, N.Y. |
| [32] | Priority | July 21, 1967 |
| [33] | | Great Britain |
| [31] | | 33,607/67 |

[54] IRON OXIDE PIGMENTS
12 Claims, No Drawings

[52] U.S. Cl............................................................ 106/304,
106/84, 106/97, 106/101, 106/288 A, 106/308 B,
106/308 Q, 106/23, 260/39, 260/37
[51] Int. Cl........................................................ C09c 1/24
[50] Field of Search.............................................. 106/304,
308 I, 308 O, 308; 117/100 I

[56] References Cited
UNITED STATES PATENTS

| | | | |
|---|---|---|---|
| 1,855,211 | 5/1932 | Walton............................ | 106/308 I X |
| 2,296,638 | 9/1942 | Hanahan........................ | 106/304 X |
| 2,904,395 | 9/1959 | Downs et al................... | 106/304 X |
| 3,121,017 | 2/1964 | Berstein et al................. | 106/304 X |
| 3,136,648 | 6/1964 | Jackson......................... | 106/304 X |
| 3,165,419 | 1/1965 | Bayer............................. | 106/304 X |
| 3,201,347 | 8/1965 | Chessick et al................ | 117/100 I X |
| 3,333,980 | 8/1967 | McCord......................... | 106/308 |

FOREIGN PATENTS

| | | | |
|---|---|---|---|
| 54,749 | 3/1967 | Germany....................... | 106/304 |

*Primary Examiner*—Tobias E. Levow
*Assistant Examiner*—H. M. S. Sneed
*Attorney*—Connolly and Hutz

ABSTRACT: Coloring matter deposited on iron oxide particles obtained by precipitation, produces stable light-fast pigments with enhanced tinctorial value. These composite pigments, which have a greatly diminished tendency to separate into their component colors, are useful in coloring concrete, bricks, plastics, textiles and paints.

IRON OXIDE PIGMENTS

BACKGROUND OF THE INVENTION

This invention relates to iron oxide pigments and, in particular, is concerned with iron oxide pigments on which have been deposited other coloring materials.

Iron oxide pigments are commercially available in a range of shades from yellow through marigold, red and brown to black. Any given iron oxide pigment can be mixed with other pigments or coloring materials to give pigment compositions of various colors. Unfortunately, these mixed compositions often tend to show "floating" in use. That is, during setting of materials (such as a paint, or a concrete mix) in which such a mixed pigment mixture has been incorporated, one of the pigments separates (floats) from the others and forms streaks or patches which give a variegated effect to the surface of the material.

The novel composite pigments of this invention provide a means for combining iron oxides with other coloring matter without developing an undesirable tendency for the pigment components to separate or float apart. These new pigments show reduced light sensitivity, a low tendency to fade and excellent light fastness. The colors manifested by these pigments are bright and have higher tinctorial value.

SUMMARY OF THE INVENTION

This invention relates to pigments which are comprised of particles of an iron oxide obtained by precipitation upon which other coloring matter is deposited to form the pigment.

Preferable iron oxide particles which can be used to form these new pigments include ferrite yellow precipitated iron oxide, precipitated black iron oxide and precipitated red iron oxide.

Preferable coloring materials which may be deposited on the iron oxide pigments include carbon black, azo coloring materials, (particularly monoazo dyes), vat dyes (particularly indigoid vat dyes and anthraquinonoid vat dyes) and phthalocyanine coloring materials.

This invention also relates to a method for forming a pigment in which coloring matter is deposited on particles of precipitated iron oxide while the particles are suspended in an aqueous medium. In one preferred method for producing these pigments, the coloring matter to be deposited is formed in situ in the aqueous medium in which the precipitated iron oxide particles are suspended.

Formation of the coloring matter in situ is preferred when the coloring matters are vat dyes and monoazo dyes.

This invention also relates to pigments obtained by depositing coloring matter on precipitated iron oxide particles.

DETAILED DESCRIPTION OF THE INVENTION

The basis of this invention is the discovery that certain iron oxides, in particular those obtained by precipitation (by contrast with those that have been ignited or otherwise exposed to drying conditions), can be associated with other coloring materials to form pigments of various colors while the tendency to show floating or separation is kept within acceptable limits. According to the invention, the other coloring materials are deposited on the iron oxide particles, as distinct from conventional pigments in which the other coloring materials would be present simply as discrete particles in mere physical admixture with the iron oxide particles.

A wide variety of coloring materials can be used for association with the precipitated iron oxides. Preferred coloring materials include carbon black, azo coloring matters (particularly monoazo dyes), phthalocyanines and vat dyes (particularly indigoid vat dyes and anthraquinonoid vat dyes). Useful iron oxides include ferrite yellow precipitated iron oxides, precipitated black iron oxides and precipitated red iron oxides. A particularly pleasing range of colors can be obtained with the joint use of ferrite yellow and phthalocyanines (phthalocyanine red and green shades of blue, and blue and yellow shades of green).

The method employed to prepare the "composite pigment" particles constituting the novel pigments of this invention entails depositing the coloring matter onto particles of the precipitated iron oxide suspended in an aqueous medium. The deposition of the coloring matter on the particles of precipitated iron oxide may be accomplished in many ways. Among the simplest methods is the one where a washed suspension of precipitated iron oxide is prepared and mixed with a suspension or dispersion of the coloring matter or dye. After the coloring matter is deposited on the iron oxide particles, the excess water is removed. Those skilled in the art will be able to determine the appropriate deposition period as well as other deposition variables for each combination of one or more coloring materials and each type of iron oxide particle.

In some instances, as when a simple monoazo dye is employed as coloring matter, the coloring matter to be deposited can be formed in situ (i.e. in the iron oxide suspension), as by the coupling of a diazonium salt (e.g. diazotized p-nitraniline) with a phenol (e.g. β-napthol). In the in situ preparation, the dye, itself, is formed in the suspension of iron oxide particles. Similarly, composite iron oxide vat dye pigments can be prepared by hydrolyzing and oxidizing a water-soluble derivative of a vat dye (e.g. a sulfonic acid ester of the leuco form of the dye) in a suspension of the iron oxide, so that the parent vat dye formed by regeneration is deposited directly onto the iron oxide particles.

The color of the final pigment produced in any given case will depend on the particular iron oxide (whether yellow, red, etc.) employed, the other coloring material employed (this need not be a single dye or coloring component) and the weight ratio of the latter (generally less than 1:1) to the iron oxide. Those skilled in the art will be able to select the correct iron oxide and coloring material for each desired color and application. Where more than one coloring material is deposited on a given iron oxide particle, the resultant pigment color will depend on the colors of the deposited coloring materials and the iron oxide used.

The precipitated iron oxide particles which are used to form the novel pigments are produced by conventional means well known to those skilled in the art. The ferrite yellow precipitated iron oxide is a synthetically produced yellow iron oxide and may be formed from a solution of iron salts which is contacted with scrap iron and air in the presence of seed particles. These seed particles may be produced by precipitating soluble iron with NaOH and oxidizing the precipitate. The precipitated red iron oxide is also produced by conventional means well known to those skilled in the art. A process which may be used for producing the red iron oxide is similar to that used to produce yellow iron oxide except for the fact that the seed material is different. The precipitated black iron oxide may also be produced by conventional means from solutions of iron salts.

The properties of the new pigments allow them to be conveniently used in coloring concrete, tile and brick as well as in paints and plastics.

The new pigments may also be used for textile printing. In this application, the dry pigment may be dispersed in a suitable synthetic resin (for example, melamine or urea/formaldehyde) and the resin polymerized by heat, after being printed on the textile by roller or screen, to bind the pigment to the textile fiber. This method may also be used to print wallpaper or other paper products. Generally, these new pigments are useful where brightness, light-fastness and diminished tendency to "float" or separate are important. More than one pigment may be used to color a given material.

The following examples are given solely for the purposes of illustration and are not to be construed as limiting this invention, many variations of which are possible without departing from the spirit or scope thereof.

EXAMPLE I

This example illustrates the treatment of a ferrite yellow precipitated iron oxide (FeO·OH) with a green phthalocyanine pigment to produce a bright green pigment.

A suspension of freshly precipitated ferrite yellow (750 ml. of suspension prepared by conventional means and containing 38.5 gm. of hydrated iron oxide) was washed five times by decantation with cold water. The final volume of the suspension was 1,500 ml. (Note: In the procedure of this and all other examples, the precipitated iron oxide is washed by decantation, not filtered off first and then washed. Following the latter procedure yields a filter cake which, on resuspension in water, absorbs other coloring materials far less tenaciously).

An aqueous dispersion (30 gm.) of a green phthalocyanine pigment was diluted to 500 ml. with cold water. [The dispersion was that sold under the name Irgalite Fast Brilliant Green 2 GL Paste (Geigy Chemicals Co.) whose dry solids content (about 25 percent) was predominantly formed by a chlorinated copper phthalocyanine with a small amount of anionic dispersing and wetting agents.]

The phthalocyanine suspension was added, over 5 minutes, to the stirred ferrite yellow suspension and, after addition had been completed, the mixture was kept stirred for a further 10 minute period and then allowed to stand. After about 4 hours, the supernatant liquid was seen to be transparent and colorless, indicating that all the phthalocyanine had become absorbed on the ferrite yellow.

The green pigment that had settled out was washed several times by decantation with water, and then filtered off and drained. The wet filter cake obtained was dried in air at 100° C. to a freeflowing bright green pigment.

The product was in the form of a dry powder suitable for use directly (i.e. without requiring the addition of dispersing and wetting agents to prevent "floating") as a pigment for cement and concrete mixes.

EXAMPLE II

This example illustrates the treatment of a blue-tone precipitated black iron oxide (FeO·Fe₂O₃) with a carbon black pigment to produce a black pigment of higher tinctorial value and deepened blue mass tone, capable of giving bluer shades on reduction with white pigment.

A suspension of freshly precipitated black iron oxide (1,000 ml. of suspension prepared by conventional means and containing 68.3 gm. FeO·Fe₂O₃) was washed five times by decantation with cold water.

An aqueous dispersion of carbon black pigment (paper-dyeing quality; 5 gm. containing 1.75 gm. dry pigment) was diluted to 500 ml. with cold water.

The carbon black suspension was added over 5 minutes to the stirred iron oxide suspension and, after addition had been completed, the mixture was kept stirred for a further ten minute period and then allowed to stand. After about 4 hours, the supernatant liquid was seen to be transparent and colorless, indicating that all the carbon black had become adsorbed on the black iron oxide. The black pigment that had settled out was washed several times by decantation with water, filtered off, drained and dried in air at 100° C.

EXAMPLE III

This example illustrates the treatment of a precipitated red iron oxide (Fe₂O₃) with a carbon black pigment to produce a brown pigment.

A suspension of freshly precipitated red iron oxide (600 ml. of suspension prepared by conventional means and containing 93.0 gm. Fe₂O₃) was washed five times by decantation with cold water. The final volume of the suspension was 1,500 ml.

An aqueous dispersion of carbon black pigment (paper dyeing quality; 20 gm. containing 7.0 gm. dry pigment) was diluted to 500 ml. with cold water.

The carbon black suspension was added over 5 minutes to the stirred iron oxide suspension and, after addition had been completed, the mixture was kept stirred for a further 10 minute period and then allowed to stand. After about 4 hours, the supernatant liquid was seen to be transparent and colorless indicating that all the carbon black had become adsorbed on the red iron oxide. The brown pigment that had settled out was washed several times by decantation with water, filtered off, drained and air dried at 100° C.

The product was suitable for use as a pigment in cement and concrete mixes, and also as a pigment for sand/lime or cement/limestone bricks, in the course of whose manufacture a final curing step using superheated steam is employed.

EXAMPLE IV

This example illustrates the treatment of a ferrite yellow precipitated iron oxide with materials which, in situ, couple to form an azo dye which then becomes deposited on the iron oxide.

A suspension of freshly precipitated ferrite yellow (200 ml. of suspension prepared by conventional means and containing 8.3 gm. of hydrated iron oxide) was washed five times by decantation with cold water and then made alkaline (NaOH) to phenolphthalein. The final volume of the suspension was 200 ml.

A stock solution of phenolic coupling component was prepared as follows:

A quantity of 5 gm. Brenthol AS (Imperial Chemical Industries Trade Mark; 3-hydroxy-2-naphthanilide) was mixed into a paste with 20 ml. of 20 percent aqueous NaOH solution and the mass was gently warmed until formation of sodium salt was complete. A volume of 500 ml. hot water was then added, and the solution was heated to boiling point and then diluted with cold water to give a final volume of 1,000 ml.

A quantity of 5.0 gms. Brentamine fast orange G.C. salt was dissolved in 500 ml. cold water (no higher than 10° C.) to obtain a solution of diazonium salt. (Brentamine: Imperial Chemical Industries trade mark; the particular material here employed was a stabilized diazotized primary amine referred to in the Color Index as AZOIC DIAZO COMPONENT NO. 2, i.e. the stabilized diazocomponent prepared from m-chloraniline.)

A 200 ml. volume of the stock solution of phenolic coupling component was added to the ferrite yellow suspension. With the temperature of the mixture not higher than 10° C., the diazonium salt solution (Brentamine) (500 ml.) was run into the mixture with constant stirring over 5 minutes. The mixture was stirred for a further 5 minutes, and then heated to boiling point to decompose any unreacted diazonium salt. Heating was then stopped. After standing for 10 minutes (by which time the supernatant liquid was perfectly clear), the pigment that had settled out was washed four times by decantation and filtered at the pump. The filter cake was washed once with hot water, then air-dried at 100° C. to give a soft free-flowing orange pigment.

Iron oxide/monoazo dye composite pigment, such as that obtained by the procedure of this example, can be used in organic-solvent-based or water-based (emulsion) paints, particularly when pastel shades relatively fast to light are desired. The pigments are also useful in textile dry printing processes, and can be used to provide inexpensive light-fast pale shades.

EXAMPLE V

The procedures of example IV were repeated, using β-naphthol instead of Brenthol AS, and a reddish orange pigment, with substantially identical properties, was obtained.

EXAMPLE VI

This example illustrates the treatment of ferrite yellow precipitated iron oxide with a water-soluble derivative of a vat dye under conditions such as to hydrolyze the derivative and cause oxidation to the vat dye proper, which then becomes deposited on the ferrite yellow.

A suspension of freshly precipitated ferrite yellow (200 ml. of suspension prepared by conventional means and containing 8.3 gm. of hydrated iron oxide) was washed five times by decantation with cold water and then made alkaline ($Na_2CO_3$) to phenolphthalein. The final volume of the suspension was 200 ml.

1.0 gm. of soluble vat dye derivative (Imperial Chemical Industries Soledon Blue 4BC 125—an indigoid vat dye derivative) was dissolved in 200 ml. of water at 50° C., and the solution was added to the ferrite yellow suspension previously prepared.

1.0 gm. of sodium nitrite was dissolved in 50 ml. warm water, and the solution added to the mixture of vat dye derivative and ferrite yellow. The mixture was then diluted to 1,000 ml., heated to 50° C., and stirred well, and 10 ml. of 7 percent aqueous hydrochloric acid were slowly added over 1 minute. The temperature was then raised to 100° C. in order to flocculate a small amount of colloidal vat pigment present. After standing for 5 minutes (by which time the supernatant liquid was perfectly clear), the pigment which had settled out was washed four times by decantation with cold water, and filtered at the pump. The filter cake was washed once with hot water, then air-dried at 100° C. to give a soft free-flowing olive green pigment.

Iron oxide/vat dye composite pigments such as that obtained by the procedure of this example can (like the monoazo composite pigments already referred to) be used in textile printing by dry fixation processes, in which the dry pigment, dispersed in a suitable synthetic resin (e.g. melamine or urea/formaldehyde), is printed by roller or screen, and the resin is polymerized by heat to cause the pigment to become bound to the textile fiber.

EXAMPLE VII

The procedures of example VI were repeated using anthraquinonoid vat dye derivatives Soledon Blue 2RCS and Soledon Jade Green XS (Imperial Chemical Industries) instead of the indigoid derivative used in example VI. The resultant composite pigments had an olive green tone and had properties substantially identical to the pigments formed in example VI.

What is claimed is:

1. The method for preparing iron oxide pigments which consists essentially of suspending particles of precipitated pigmentary iron oxide in an aqueous medium and depositing directly on said suspended particles less than about one part by weight thereof, of a coloring material selected from the group consisting of carbon black, azo coloring materials, vat dyes, and phthalocyanine coloring materials.

2. The method of claim 1, in which the coloring material to be deposited is a vat dye or a monoazo dye and is formed in situ.

3. The method of claim 2, in which a monoazo dye is deposited.

4. The method of claim 2, in which a vat dye is deposited.

5. The method of claim 1 in which the coloring material is an indigoid vat dye.

6. The method of claim 1, in which the coloring material is an anthraquinonoid vat dye.

7. The method of claim 1, in which the coloring material comprises a phthalocyanine.

8. A pigment produced by the method of claim 1.

9. The method of claim 1, in which the coloring material comprises carbon black.

10. A pigment, as in claim 8, in which the iron oxide is a ferrite yellow precipitated iron oxide.

11. A pigment, as in claim 8, in which the iron oxide is a precipitated black iron oxide.

12. A pigment, as in claim 8, in which the iron oxide is a precipitated black iron oxide.

* * * * *

PO-1050
(5/69)

UNITED STATES PATENT OFFICE
CERTIFICATE OF CORRECTION

Patent No. 3,619,227           Dated November 9, 1971

Inventor(s) Frederick Roy Tomkinson

It is certified that error appears in the above-identified patent and that said Letters Patent are hereby corrected as shown below:

Column 6 (claim 12), line 36 change "black iron oxide" to -- red iron oxide --.

Signed and sealed this 25th day of April 1972.

(SEAL)
Attest:

EDWARD M. FLETCHER, JR.　　　　　　　　　　ROBERT GOTTSCHALK
Attesting Officer　　　　　　　　　　　　　Commissioner of Patents